United States Patent [19]

Ostrander

[11] E Patent Number: Re. 33,018

[45] Reissued Date of Patent: Aug. 15, 1989

[54] SLIPPER

[75] Inventor: Charles Ostrander, Middletown, N.J.

[73] Assignee: Consolidated Foods, Winston-Salem, N.C.

[21] Appl. No.: 66,705

[22] Filed: Jun. 26, 1987

Related U.S. Patent Documents

Reissue of:

[64] Patent No.: 4,554,749
Issued: Nov. 26, 1985
Appl. No.: 653,484
Filed: Sep. 21, 1984

U.S. Applications:

[63] Continuation of Ser. No. 424,153, Sep. 27, 1982, abandoned.

[51] Int. Cl.[4] ..... A43B 01/10

[52] U.S. Cl. ..... 36/102; 36/103; 36/9 R; 36/31; 36/83

[58] Field of Search ..... 36/10, 31, 8.3, 97, 36/103, 9 R, 113, 99, 102, 112, 138, 7.1 R

[56] References Cited

U.S. PATENT DOCUMENTS

| | | | |
|---|---|---|---|
| 1,859,642 | 4/1932 | Brodick | 36/8.3 |
| 2,252,315 | 8/1941 | Doree | 36/9 R |
| 2,619,743 | 12/1952 | Harris | 36/8.3 |
| 2,771,691 | 11/1956 | Luchs | 36/10 |
| 2,848,885 | 8/1958 | Goodman | 36/10 |
| 2,926,433 | 3/1960 | Kramer | 36/9 R |
| 2,996,814 | 8/1961 | Baker | 36/9 R |
| 3,016,631 | 1/1962 | Servin | 36/9 R |
| 3,024,543 | 3/1962 | Klym | 36/9 R |

OTHER PUBLICATIONS

"Ripon Funtime Footwear", 1957, Exhibit #36, Ladies Leather Soled Slipperette.

*Primary Examiner*—Steven N. Meyers
*Attorney, Agent, or Firm*—Amster, Rothstein & Ebenstein

[57] ABSTRACT

A slipper including an upper defining a cover for substantially encompassing a foot which is formed at least partially of elastomeric material, and a sole divided into discrete, spaced fore and aft sections secured to a base portion of the cover.

13 Claims, 1 Drawing Sheet

SLIPPER

Matter enclosed in heavy brackets [ ] appears in the original patent but forms no part of this reissue specification; matter printed in italics indicates the additions made by reissue.

This application is a continuation of application Ser. No. 424,153 filed Sept. 27, 1982, now abandoned.

BACKGROUND, BRIEF SUMMARY AND OBJECTS OF THE INVENTION

This invention relates to slippers in general, and more particularly to slippers of a new and improved construction which permit greater sole flexibility, and which will at all times snugly fit the feet of the wearer.

The concept of the present invention may be applied to various types of slippers such as house slippers, ballet slippers, etc. When ballet dancing, for example, the feet of a dancer frequently arch when on the toes. This arching shortens the distance between the toe and heel as compared to the distance between toe and heel when the foot is flat on the floor. The slipper construction compensates for variations in the shape of the feet of a wearer during natural foot flexion and movement. The construction also provides a better fit for slight variations in foot size.

The slipper comprises an upper or cover for encompassing the foot of a wearer and is at least partially formed and preferably entirely formed of elastic material. The cover includes a toe portion, a heel portion, a shank portion interconnecting the toe and heel portions, and a base portion integral with the toe, heel and shank portions. Inner and outer soles, which may be of leather or other suitable durable materials, overlap sections of the cover base portion and are secured thereto. Each of the inner and outer soles is divided into distinct forward and rearward sections attached to the base portion of the upper in a prescribed manner with the forward section being spaced from the rearward section. The upper may be formed by folding and sewing elastomeric fabric material.

One of the primary objects of the invention is the provision of a new and improved extremely flexible and adjustable slipper which snugly grips and fits the foot of a wearer while permitting natural flex and movement of the foot.

Another object of the invention is the provision of a new and improved shoe which permits adjustment and provides support without binding or cramping the foot of the wearer in all positions of use.

A further object of the invention is the provision of a slipper which is attractive, durable, and economical to manufacture.

Other objects and advantages of the invention will become apparent when considered in view of the following detailed description.

DETAILED DESCRIPTION OF THE INVENTION

Figure 3:
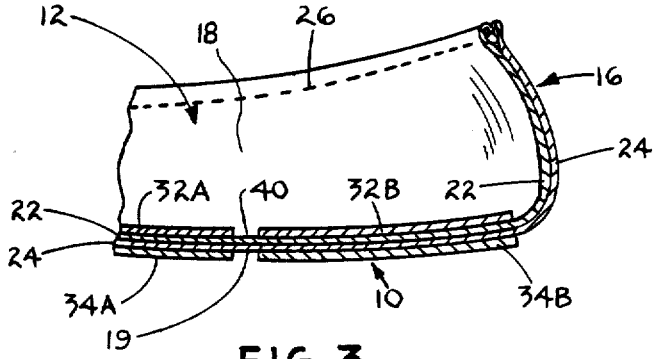
FIG. 3 is an enlarged fragmentary diagrammatic vertical section through a portion of the slipper.
Figure 2:
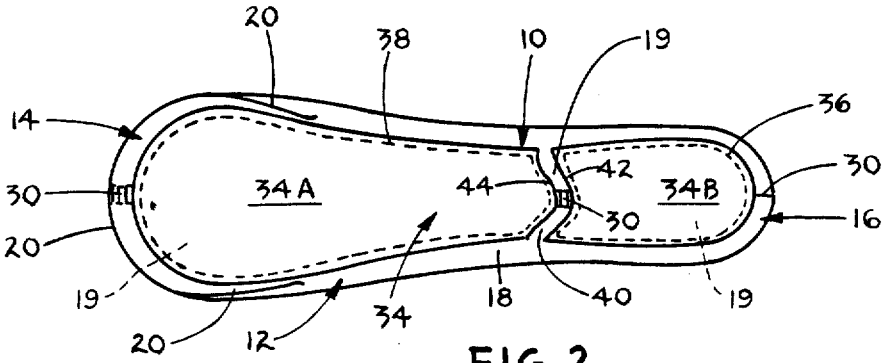
FIG. 2 is a bottom plan view of the slipper of FIG. 1.
Figure 1:
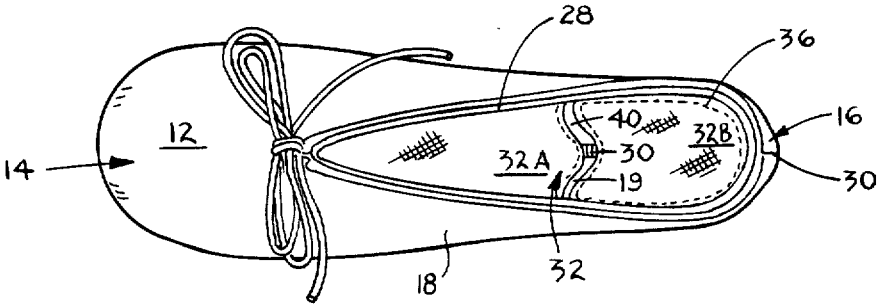
FIG. 1 is a top plan view of a slipper embodying this invention and illustrating the distinct inner sole sections.

Referring to the drawing, and initially to FIGS. 1–3, the slipper includes a sole 10, and an upper 12 which defines a cover including a toe or forward portion 14, a heel or aft portion 16, an intermediate shank portion 18 and a base portion 19 which extends from the toe portion to the heel portion under the foot of a wearer, and preferably is integral with the toe, heel and shank portions.

The upper 12 may may be formed from soft, flexible, elastomeric fabric which is cut to the desired configuration, folded and sewn at 30 from the toe 14 to the heel 16 along the base portion 19 and also along line 20 extending to the front and sides of the toe portion. The seam 30 runs longitudinally of the slipper and permits uniform stretch of the upper fabric. In a preferred embodiment, the upper is formed of inner 22 and outer 24 layers of fabric having substantially the same configuration and which extend under and substantially encompass the foot of a wearer. The upper edges of the fabric layers are stitched along line 26 to define an opening 28 for insertion of a foot. An elastic member may be encompassed by the upper marginal edges of the fabric defining opening 28.

The sole 10 includes an inner sole 32 and an outer sole 34, each of which is divided into discrete sections 32A, 32B and 34A, 34B which overlie portions of the elastic material defining the base portion 19. The rearwardmost sections 34B and 32B are positioned in aligned relation on opposite sides of the fabric base portion or section 19 and are secured thereto by stitching 36, as shown by FIGS. 1 and 2 to encompass sections of base portion 19. The forward sections 32A and 34A also are aligned on opposite sides of fabric 22, 24 and attached thereto by stitching 38 in a similar manner. The fabric layers 22, 24 extend throughout the areas between the inner and outer soles. Note that in the relaxed condition of the elastomeric cover or upper 12, the inner and outer forward and rearward sections of the sole are attached to the upper base portion 19 in spaced relation to define a preselected spacing 40 between the forward and rearward sections.

The discrete, spaced sole sections permit greater flexibility of the sole and also permit the distance 40 between the sole sections to increase, when worn, due to movements of the foot. In effect, the length of the slipper, including upper and sole, can be increased, when worn, due to the separate, longitudinally spaced sole sections and the elastomeric shank portion 18 and base portion 19 between the sole sections.

The adjacent marginal edges 42 and 44 of the forward and rearward sections are such that the distance 40 there between preferably remains substantially constant. However, the basic pattern or configuration of each of the forward and rearward sole sections 34A, 34B and 32A, 32B may vary.

While the drawing illustrates stitching for securing the inner and outer soles to the upper, it is to be understood that the various components may be secured together by adhesive or other suitable means.

Figure 4:
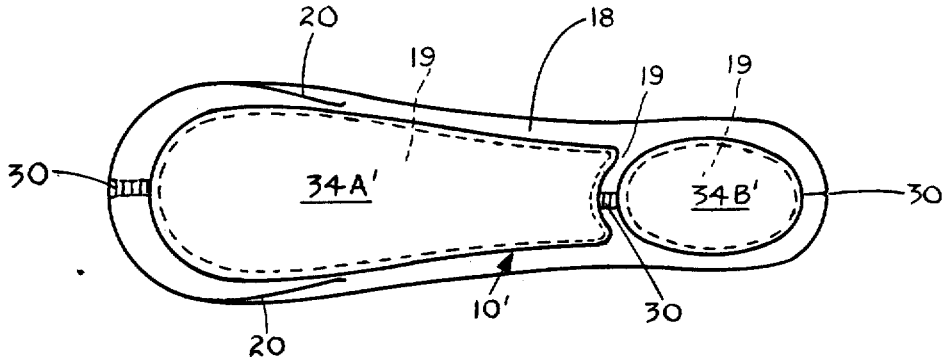
FIG. 4 is a bottom plan view of an alternate embodiment of the slipper.

FIG. 4 illustrates a modified embodiment of the slipper wherein the sole 10' is formed of outer fore and aft sections 34A' and 34B' having different configurations from those shown by FIG. 2. The slipper of FIG. 4 may also be provided with inner sole sections.

What is claimed is:

1. A flexible slipper comprising an upper defining a cover for encompassing the foot of a wearer, said cover including a unitary layer of elastic fabric defining a toe portion, a heel portion, a shank portion and a base portion, said shank portion interconnecting said toe and heel portions, said base portion interconnecting said toe, heel and shank portions and extending throughout the length of the slipper from the toe portion to the heel portion and beneath the foot of a wearer, and a sole comprising discrete fore and aft sections positioned in predetermined, spaced relation overlying sections of said base portion and means securing said fore and aft sections to said base portion, *said sole comprising an inner sole and an outer sole, each of said inner and outer soles including fore and aft discrete sections secured in spaced relation to said base portion.*

2. The flexible slipper of claim 1, wherein the upper includes plural layers of elastic material.

[3. The flexible slipper of claim 1, wherein said sole comprises an inner sole and an outer sole, each of said inner and outer soles including fore and aft discrete sections secured in spaced relation to said base portion.]

4. The flexible slipper of claim [3] *1*, wherein said aft sections of said inner and outer [sections] *soles* have substantially the same configuration and are secured to said base portion in aligned, superposed relation to encompass sections of said base portion [there between] *therebetween.*

5. The flexible slipper of claim [3] *1*, wherein adjacent marginal edges of said fore and aft discrete sections are interconnected by an exposed elastic section of said shank portion.

6. A flexible slipper comprising an upper defining a cover for encompassing the foot of a wearer, said cover including a unitary layer of elastic fabric defining a toe portion, a heel portion, a shank portion, and a base portion, said shank portion interconnecting said toe and heel portions, said base portion interconnecting said toe, heel and shank portions and extending throughout the length of the slipper from the toe portion to the heel portion and beneath the foot of a wearer, an inner sole comprising discrete fore and aft sections attached to the inner side of said base portion in predetermined spaced relation, an outer sole comprising discrete fore and aft sections attached to the outer side of said base portion in predetermined spaced relation and aligned with said respective fore and aft sections of said inner sole, whereby a section of said elastic fabric defining said base portion is exposed intermediate said discrete fore and aft sections of said inner and outer soles.

7. The flexible slipper of claim 6, wherein the slipper includes plural layers of elastic material.

8. The flexible slipper of claim 6 wherein said fore and aft discrete sections of said inner and outer soles have substantially the same configuration and are secured to said base portion in aligned, superimposed relationship.

*9. The flexible slipper of claim 1 wherein said fore sections of said inner and outer soles have substantially the same configuration and are secured to said base portion in aligned, superposed relation to encompass sections of said base portion therebetween.*

*10. A flexible slipper comprising an upper defining a cover for encompassing the foot of a wearer, said cover defining a toe portion, a heel portion, and shank portion and a base portion, said shank portion interconnecting said toe and heel portions, said base portion interconnecting said toe, heel and shank portions and extending throughout the length of the slipper from the toe portion to the heel portion and beneath the foot of a wearer, and a sole comprising descrete fore and aft sections positioned in predetermined, spaced relation overlying sections of said base portion and means securing said fore and aft sections to said base portion, said toe, heel, shank and base portions being elastic in all the areas surrounding said fore and aft sections of said sole, said sole comprising an inner sole and an outer sole, each of said inner and outer soles including the fore and aft discrete sections secured in spaced relationship to said base portion.*

*11. The flexible slipper of claim 10, wherein said toe, heel, shank and base portions are formed of elastic fabric.*

*12. The flexible slipper of claim 11 wherein said toe, heel, shank and base portions are formed of a layer of elastic fabric.*

*13. The flexible slipper of claim 10 wherein said upper includes plural layers of the same elastic material, and said wherein said plural layers of the same elastic material in said upper are substantially coextensive.*

*14. The flexible slipper of claim 10 wherein said upper includes plural layers of the same elastic material, and said wherein said plural layers of the same elastic material in said upper are formed by folding the elastic material.*

* * * * *